March 1, 1932.  H. M. BRADBURY  1,847,861
AUTOMOBILE VENTILATOR
Filed Sept. 14, 1928
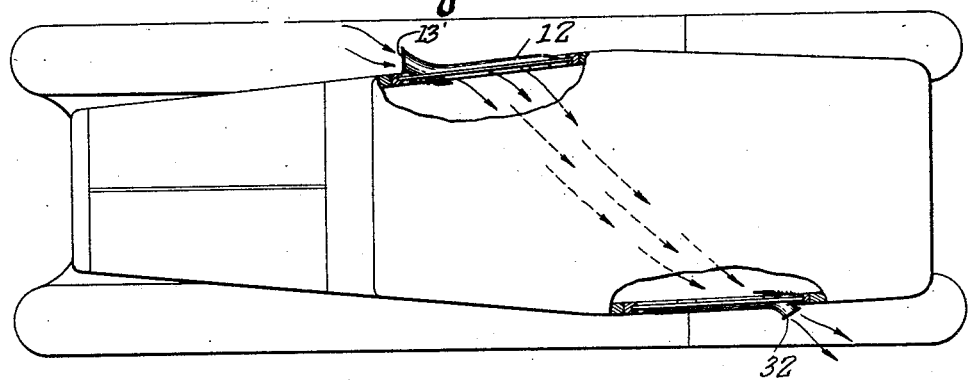
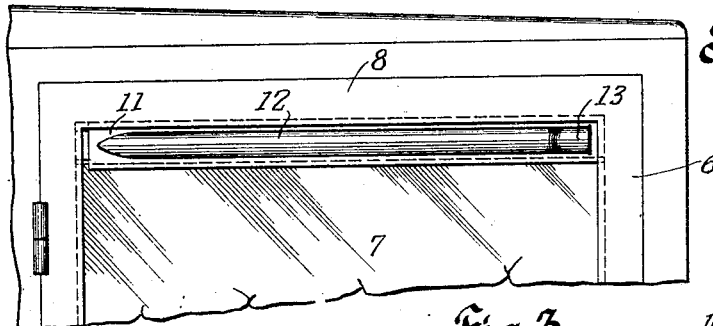
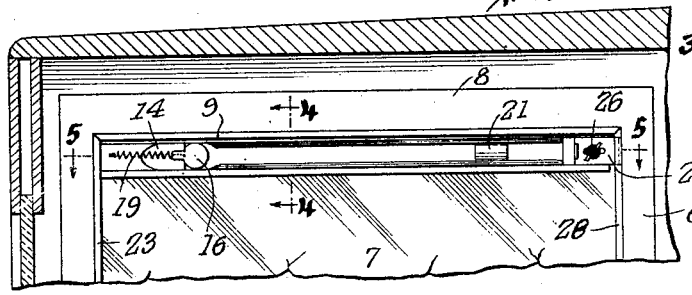
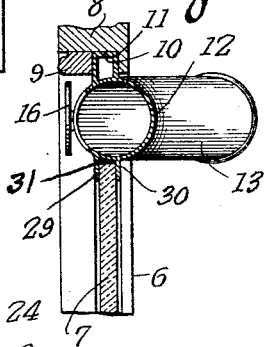
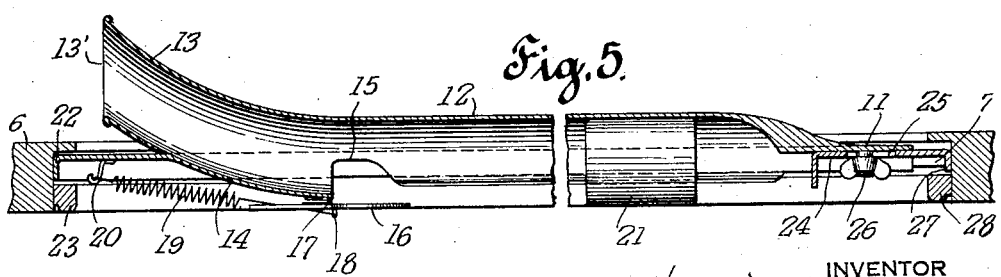
INVENTOR
Henry M. Bradbury
BY
ATTORNEY Patented Mar. 1, 1932

1,847,861

UNITED STATES PATENT OFFICE

HENRY M. BRADBURY, OF BROOKLYN, NEW YORK

AUTOMOBILE VENTILATOR

Application filed September 14, 1928. Serial No. 306,053.

This invention relates to ventilators, and more particularly to ventilators for automobiles of the closed type.

While the closed type of automobile has many desirable features, it is at times very objectionable in the summer time when the weather is warm and the roads are dusty. Under such conditions the air in the closed automobile becomes very warm, impure and disagreeable, and this condition is not improved by opening the windows, for an open window allows the disagreeable dust from the road to enter the car, and add to the discomfort created by the warm air.

It has been found that by creating a draft diagonally of the car, the ventilation may be considerably improved, and it is an object of this invention to provide a device which may be attached to the front and rear doors or windows of a closed car to create such a draft.

It is further object of the invention to provide a ventilating device in the form of an attachment which may be placed into operative position without altering in any way the structure of the automobile.

These and other objects are attained by the novel construction, combination and arrangement of parts hereinafter described and shown in the accompanying drawings, constituting a material part of this disclosure and in which:

Fig. 1 is a plan view of a closed automobile diagrammatically showing the path of the ventilating air when the device is used.

Fig. 2 is a side view of a front door on the right side of an automobile, having the device attached thereto.

Fig. 3 is an interior side view of the door shown in Fig. 2.

Fig. 4 is a sectional view taken on the line 4—4 of Fig. 3.

Fig. 5 is a sectional view taken on the line 5—5 of Fig. 3.

Referring in greater detail to the drawings, in Fig. 1, it is seen that one of the devices is attached to the front door or window on the right side of the automobile, and another of the devices is attached to the rear door or window on the left side of the automobile, thus causing a draft of air as shown by the arrows.

As is shown in the figures, the ventilating device is positioned between the sides 6 of the window frame, the glass 7, and the top 8 of the frame. The top 8 of the frame is usually provided with a molding strip 9 which serves to support the glass when in a completely raised position. When the ventilating device is used, the hollow sheet metal flange 10 is positioned against the molding strip 9 and up against the top 8 of the frame. Integral with the flange 10 is a sheet metal plate 11, which is bent out at 12 to a cylindrical tube 12, which extends into a throat 13 turned at an angle to the body of the tube 12 and has its mouth 13' at right angles to the direction in which the automobile may be travelling.

The inner portion 14 of the throat 13 extends inwardly beyond the inner edge of the tube 12 and is provided with a cut-out portion 15 to accommodate a cover 16 for closing the throat when the ventilator is not in use. The cover 16 is pivoted to the throat 17 and has attached to it at 18, beyond the pivot, one end of a spring 19, the other end of the spring being attached at 20 to the forward end of the plate 11.

A cylindrical block 21 of rubber or wood is slidable in the tube 12, and serves as a means for regulating the draft.

The plate 11 is provided at its forward end with a flange 22 which abuts the side frame member 6 and a molding strip 23. The rear end of the plate 11 has mounted thereon a small plate 24 having a slot 25 in which is slidably mounted wing nut 26 for clamping plate 24 in adjusted positions to plate 11. The plate 24 is provided with a flange 27 adapted to abut side frame member 6 and molding strip 28.

As shown in Fig. 4, the tube 12 has a pair of integral flanges 29 and 30 which form a groove to fit over the window glass 7, the upper edge of the glass resting against a felt strip 31 in the bottom of the groove.

In application, one of the devices is mounted on the front door on the right side of the automobile in the manner described above, and another of the devices is mounted on the rear door on the left side. However, it should be noted that the mouth 32 of the device on the rear door is at right angles to the draft of air received from the device on the front door, and not at right angles to the direction of travel of the automobile.

In operation, air enters the mouth 13', which is at right angles to direction of travel of the automobile, and passes into tube 12. The air will travel along the tube until it reaches the block 21, because the tube forms practically a complete cylinder, that is, it is greater than a semi-circle in cross-section as shown in Fig. 4. When the air reaches the block 21, it passes through the slot in the tube 12 and is deflected by the block 21 to the corresponding slot in the device on the rear door, where it enters the tube on the rear door and is exhausted through the mouth 32.

With the arrangement above described a steady stream of air is insured and the ventilation of the interior of the car is obviously greatly improved.

When the device is not in use, the throat 13 is closed by the cover 16, which is held in that position by reason of the manner in which spring 19 is connected. Also the spring will hold the cover in an open position when the device is in use. It will be noted that the pivot is located between both ends of the spring 19 so that when the cover 16 is in the open position as shown in Fig. 5, the spring will hold the cover in such position; while if the cover be now moved to closed position the end 18 of the spring is moved to the opposite side of the pivot—that is, point 18 is thrown "over centre" with relation to the pivot so that the spring now maintains the cover in closed position. To compensate for different dimensions of closed cars and for various non-uniform conditions, the block 21 is slid along the tube 12 so that the desired draft of air may be obtained.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:—

1. A ventilating device for closed automobiles comprising a plate adapted to be mounted between the frame and glass of a window, a cylindrical tube integral with the plate and having a longitudinal slot communicating with the interior of the automobile, a throat integral with and formed at an angle to the tube, and a cover for closing the throat.

2. A ventilating device for closed automobiles comprising a tube having a longitudinal slot communicating with the interior of the automobile, a throat positioned at an angle to and communicating with the tube, the mouth of the throat being disposed outside of the automobile, and means slidable longitudinally in the tube to regulate a draft of air flowing through the tube.

3. A ventilating device for closed automobiles comprising a tube having a longitudinal slot communicating with the interior of the automobile, a throat integral with and formed at an angle to the tube, the mouth of the throat being positioned outside of the automobile, a cover for the interior mouth of the throat, and means for resiliently holding the cover in either an open or closed position.

4. The combination with a tube ventilating device having an end open to the outer air and a longitudinal slot communicating with the interior of an automobile to be ventilated, of a regulator slidable longitudinally within the tube to regulate the flow of incoming air.

Signed at New York, in the county and State of New York, this 4th day of September, 1928.

HENRY M. BRADBURY.